(12) United States Patent
Rubin

(10) Patent No.: US 8,423,487 B1
(45) Date of Patent: Apr. 16, 2013

(54) MACHINE LEARNING APPROACH TO WAVE HEIGHT PREDICTION

(75) Inventor: Stuart H. Rubin, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 374 days.

(21) Appl. No.: 12/854,602

(22) Filed: Aug. 11, 2010

(51) Int. Cl.
*G06F 15/18* (2006.01)
*G06F 17/00* (2006.01)
*G06N 5/02* (2006.01)

(52) U.S. Cl.
USPC ............................ 706/12; 706/48; 114/312

(58) Field of Classification Search ............ 706/12, 706/48; 114/312; 116/107; 441/1–34
See application file for complete search history.

(56) References Cited

U.S. PATENT DOCUMENTS

| | | | | |
|---|---|---|---|---|
| 3,225,593 A * | 12/1965 | Richard | | 73/170.31 |
| 3,769,838 A * | 11/1973 | Buckler | | 73/170.31 |
| 3,953,905 A * | 5/1976 | Paitson | | 441/17 |
| 4,138,752 A * | 2/1979 | Dickson | | 441/23 |
| 4,220,044 A * | 9/1980 | LeBlanc et al. | | 73/170.01 |
| 4,466,281 A * | 8/1984 | Rademakers | | 73/170.31 |
| 4,515,013 A * | 5/1985 | Hue | | 73/170.01 |
| 4,986,121 A * | 1/1991 | Luscombe | | 73/170.29 |
| 5,237,872 A * | 8/1993 | Rademakers | | 73/504.07 |
| 6,775,617 B2 * | 8/2004 | Seemann et al. | | 702/3 |
| 6,847,326 B2 * | 1/2005 | Harigae et al. | | 342/357.57 |
| 2004/0056779 A1 * | 3/2004 | Rast | | 340/985 |
| 2009/0279383 A1 * | 11/2009 | Napolitano et al. | | 367/4 |
| 2011/0060525 A1 * | 3/2011 | Teng et al. | | 702/2 |

OTHER PUBLICATIONS

Mehmet Ozger et al.; "Prediction of wave parameters by using fuzzy logic approach"; Ocean Engineering 34; 2007; pp. 460-469.*
M.H. Kazeminezhad et al.; "Application of fuzzy inference system in the prediction of wave parameters"; Ocean Engineering 32; 2005; pp. 1709-1725.*
Marco P. Schoen et al.; "Wave Prediction and Fuzzy Logic Control of Wave Energy Converters in Irregular Waves"; 16th Mediterranean Conference on Control and Automation; Jun. 25-27, 2008; pp. 767-772.*
Chung-Chu Teng et al.; "Determination of Pitch and Roll Angles from Data Buoys"; IEEE, 2004; pp. 1348-1355.*
Dilectin, H. D., and R. B. V. Mercy. "Classification and dynamic class detection of real time data for tsunami warning system." Recent Advances in Computing and Software Systems (RACSS), 2012 International Conference on. IEEE, 2012.*
Kazeminezhad, M. H., A. Etemad-Shahidi, and S. J. Mousavi. "Application of fuzzy inference system in the prediction of wave parameters." Ocean Engineering 32.14 (2005): 1709-1725.*
Weller, R. A., et al. "Riding the crest: a tale of two wave experiments." Bulletin of the American Meteorological Society 72.2 (1991): 163-183.*

(Continued)

*Primary Examiner* — Jeffrey A. Gaffin
*Assistant Examiner* — James F Sugent
(74) *Attorney, Agent, or Firm* — Ryan J. Friedl; Kyle Eppele

(57) ABSTRACT

Sea characteristics are determined by using a buoy with multiple tilt switches configured to sense at plural tilt angles of the buoy. The tilt switches provide binary outputs of tilt data corresponding to the tilt angles. The binary outputs are received by a processor and are compared with sample patterns of tilt data. The comparison is used to provide an output corresponding to sea conditions.

6 Claims, 9 Drawing Sheets

OTHER PUBLICATIONS

Bonnet, O., S. Gregersen, and P. Branchereau. "The application of dynamic positioning for moored tankers." Offshore Technology Conference. 1987.*

Welch, et al., An Introduction to the Kalman Filter, TR 95-041, Department of Computer Science University of North Carolina at Chapel Hill, Chapel Hill, NC 27599-3175 (Jul. 2006).

Maksim Eskin, Design of an Inertial Navigation Unit Using MEMS Sensors, A Design Project Report Presented to the Engineering Division of the Graduate School of Cornell University (Jan. 2006).

Oliver J. Woodman, An introduction to inertial navigation, University of Cambridge Computer Laboratory, Cambridge CB3 OFD, United Kingdom, UCAM-CL-TR-696, ISSN 1476-2986 (Aug. 2007).

A (Very) Basic Primer on Wave Theory for Meteorological Instrumentation Sensor Technology (MIST), Space and Naval Warfare Systems Center, 53560 Hull St., San Diego, CA 92152-5001, Release 1.0, Nov. 5, 1997.

How are significant wave height, dominant period, average period, and wave steepness calculated?, U.S. Dept. of Commerce National Oceanic and Atmospheric Administration National Weather Service National Data Buoy Center 1007 Balch Blvd., Stennis Space Center, MS 39529 (Jun. 2010).

Shourov, Chatterji K., The search for gravitational-wave bursts in data from the second LIGO science run, Ph. D. Thesis, MIT Dept. of Physics, 2005, 2007—Chapter 4: Linear Prediction.

Xu, J.K., et al., A Weak Structural Analysis Technique to Wave Heights for Ocean Waves Image, Computer Vision and Pattern Recognition, 1988. Proceedings CVPR '88., Computer Society Conference on Issue Date: Jun. 5-9, 1988 on pp. 105-110 Location: Ann Arbor, MI (2002) ISBN: 0-8186-0862-5 INSPEC Accession No. 3258507.

* cited by examiner

US 8,423,487 B1

MACHINE LEARNING APPROACH TO WAVE HEIGHT PREDICTION

FEDERALLY-SPONSORED RESEARCH AND DEVELOPMENT

This Machine Learning Approach to Wave Height Prediction is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: ssc_pac_T2@navy.mil. Reference Navy Case No. 100324.

BACKGROUND

This disclosure relates to sensing and analysis of maritime waves.

SUMMARY OF SOME EMBODIMENTS

Sea characteristics are determined by use of a buoy provided with multiple tilt switches. The tilt switches sense at plural tilt angles of the buoy and provide binary outputs of tilt data. The binary outputs are received and provided to a processor as tilt data. The processor compares the binary outputs of tilt data with sample patterns of tilt data and uses the comparison to provide an output corresponding to sea conditions.

DETAILED DESCRIPTION OF SOME EMBODIMENTS

Figure 1:
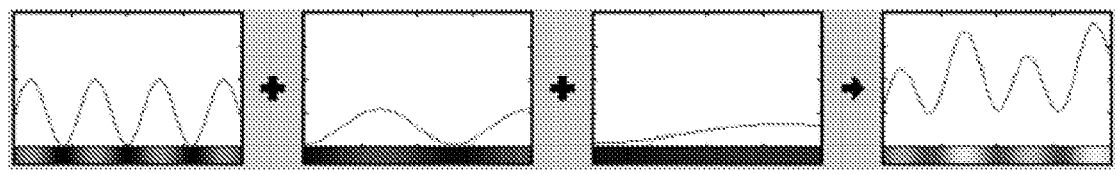
FIG. 1 is a flow diagram showing the operation of a program for acquiring and establishing a bijective correspondence between wave height and sensory patterns.

This disclosure relates to the interpretation of sensory data (e.g., as supplied by three accelerometers or at least twelve tilt-switches as a less-costly and more durable alternative). Traditional approaches to sensory determination of wave height rely on removing noise from accelerometer data, taking FFT and inverse FFT transforms, and estimating wave height in the absence of direct feedback. The approach described herein relies upon autonomously acquiring and establishing a bijective correspondence between wave height and sensory patterns, and uses the acquired data to categorize the sea conditions in an objective manner.

By way of non-limiting example, a standardized set of categories can be used to characterize sea conditions. Various scales are used to describe wave height. For example, the World Meteorological Organization (WMO) Sea State Code are based on the Douglas Sea Scale, and list nine levels, called "Sea State Codes":

| WMO Sea State Code | Wave Height (meters) | Characteristics |
| --- | --- | --- |
| 0 | 0 | Calm (glassy) |
| 1 | 0 to 0.1 | Calm (rippled) |
| 2 | 0.1 to 0.5 | Smooth (wavelets) |
| 3 | 0.5 to 1.25 | Slight |
| 4 | 1.25 to 2.5 | Moderate |
| 5 | 2.5 to 4 | Rough |
| 6 | 4 to 6 | Very rough |
| 7 | 6 to 9 | High |
| 8 | 9 to 14 | Very high |
| 9 | Over 14 | Phenomenal |

The reported sea condition may be a variance with or not fully conformant with the standardized scale, but could still be used to provide a consistent indication of sea conditions.

In another non-limiting example, the approach can be used in a five-level scale to declare one among five categories of open sea conditions (i.e., wave height) implemented for purposes of use of the present technique. The five levels are:

Level 1: Calm, nothing more than ripples with wave heights of two feet or less;

Level 2: Typical, with wave heights of between two and five feet;

Level 3: Rough, with wave heights of between five and ten feet;

Level 4: Stormy, with wave heights of between ten and twenty feet; and

Level 5: Extreme, with wave heights of over twenty feet.

Another example would be to use a set of twelve wave heights implemented according to the Beauford Scale.

In one configuration, the state of the deep ocean waves, in particular their height, is to be read and categorized into one of five levels (if a five-level scale is used). The device is marine resistant and includes a sensor package, a microprocessor, at least twelve tilt switches or three accelerometers, a transceiver, and a battery pack. The time and sequence of times at which each switch, as a member of a tier of switches, opens and closes can be associated with the true wave height in such a manner that spurious noise is mostly cancelled out (including filtering), and generalizations are automatically made, which allow the device to learn to predict wave heights in all manner of maritime environments. The device is underpinned by algorithms for machine learning. While offered as a standalone mechanism herein, it is clear that it can augment any physical (i.e., FFT-based) approach to effectively fuse their outputs for greater predictive accuracy.

FIG. 1 is a flow diagram showing the operation of a program for acquiring and establishing a bijective correspondence between wave height and sensory patterns. A competing viable technique uses Fourier techniques to separate noise from the periodic wave(s). In particular, periodic waves in the open sea typically are summations of waves of different frequencies (periods) and amplitudes, and so FIG. 1 shows a summation of waves.

Such analysis is complicated by the fact that wave periods are only empirically known. Methods tend to be more sensitive to such variables as the true wave period not being a power of two of the observation time (required for the O(n log n) Fast FFT), long periods being needed to average the transform values, and problems in using filters in conjunction with the FFT. This is based on big-O notation in computer science. In this case, the run time for the algorithm is proportional to n log n, where n is a measure for the dataset size. There is a general absence of feedback, as is fundamental to a predictor-corrector method such as this one.

All methods require sensing of the wave passage, and here is where the methods intersect. Indeed, a hybrid method has been suggested, where the physical (FFT) approach benefits from the use of information fusion to correct its predictions. Micro-machined accelerometers have been suggested because of their high sensitivity, small size, relatively low cost, and capability to measure both static and dynamic acceleration forces. By using three micro-machined accelerometers aligned in the x, y, and z planes, the measurement of acceleration along any axis is assured. This disclosure is not particular to such devices however. In particular, arrays of tilt switches can be more accurate in the presence of environmental noise than accelerometers, and this vies for the efficacy of the machine learning approach over the purely physics-based one.

In an alternative non-limiting example, it is possible to use an array of tilt switches aligned at right angles to detect when a small buoy is rising and falling with the passage of a wave. The array of tilt switches are used along with the angle(s) that the wave makes with the surface and the amount of time that the buoy rides the angle(s). This signature data can be processed in such a manner that its correlation with the level of a wave is acquired. Such processing, it is argued, works better when the true period of such waves is unknown. The tilt switches that comprise such a device are polled by a small inexpensive microprocessor to create data vectors, which after a brief learning period are properly mapped to one of the sea condition levels (e.g., one of five levels in a five-level scale), and corrected where deemed to be incorrect.

Figure 2:
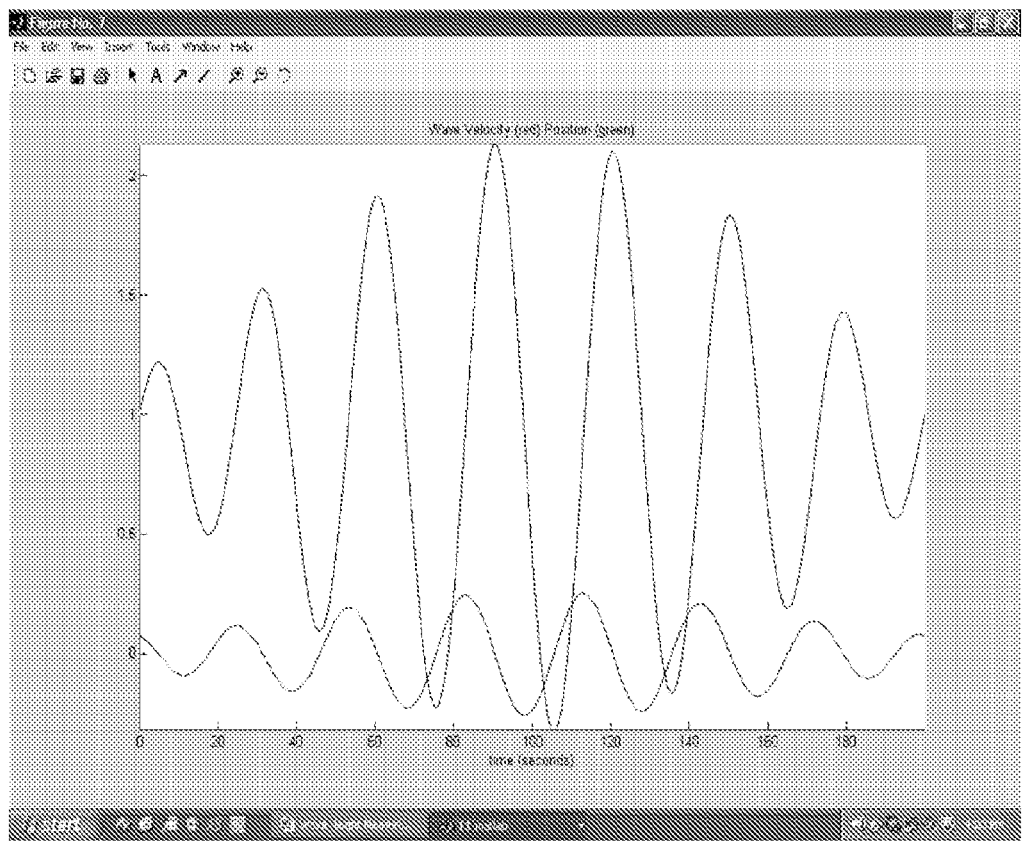
FIG. 2 is a diagram showing wave periods and an interpreted wave height. The velocity information is depicted by the small amplitude curve and the positional information is depicted by the large amplitude curve.

FIG. 2 is a diagram showing wave periods and an interpreted wave height. The velocity information is depicted by the small amplitude curve and the positional information is depicted by the large amplitude curve. This figure depicts integration of acceleration to produce velocity and positional information using Matlab. Here, the collection period is not an integral number of wave periods (as in the open sea) so the positional curve (large amplitude curve) needs to be averaged over time. Transform-based techniques require the passage of several wave periods before the techniques can estimate the various periods involved and hopefully produce an interpreted wave height, as depicted in FIG. 2. Conversely, the present approach will produce interpreted wave heights for each wave period—enabling the naïve operator to place greater reliance in the interpretations.

Figure 3:
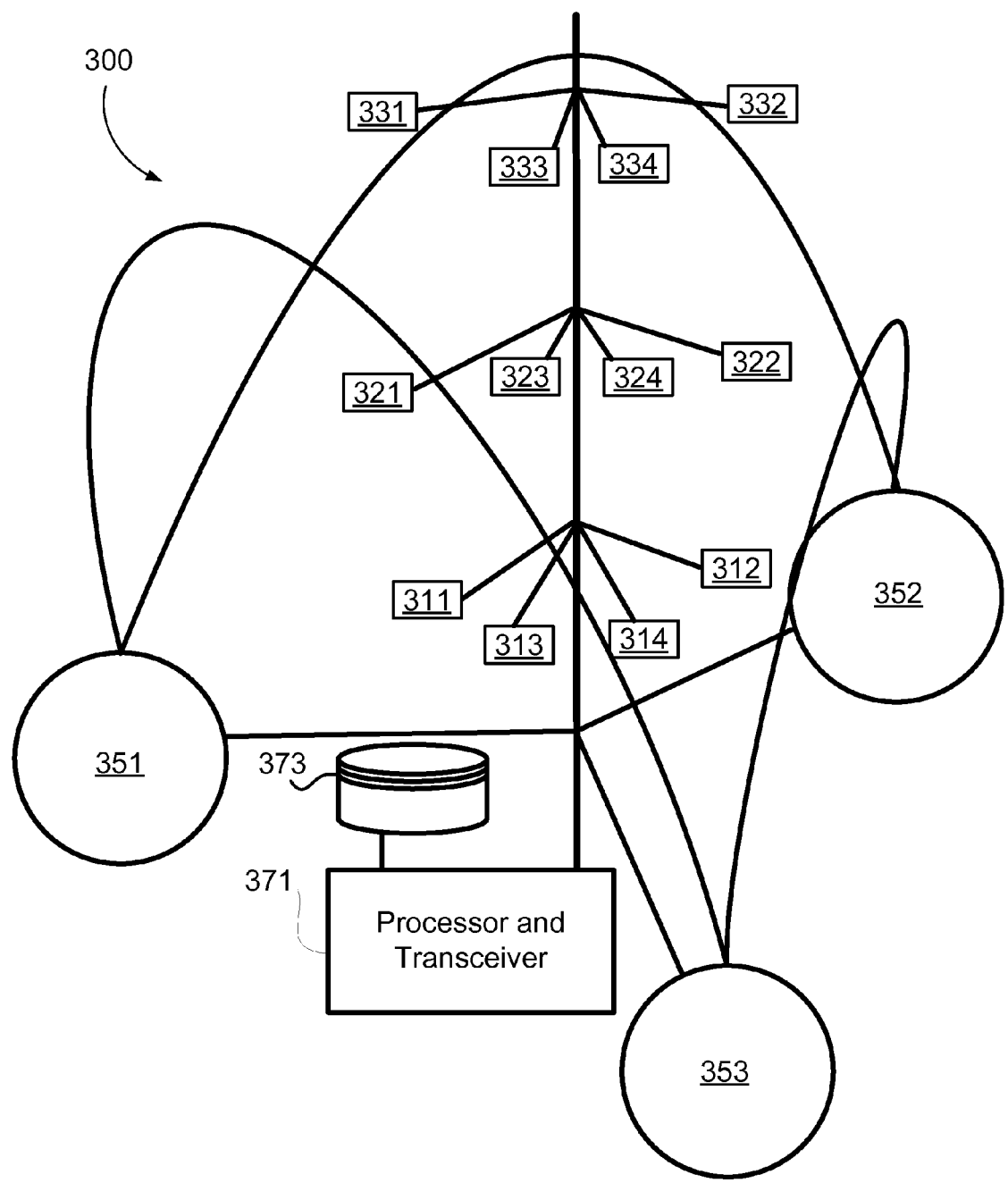
FIG. 3 is a diagram schematically showing the functional configuration of a wave height sensor system, and depicts a wave sensor system using tilt switches.

The sensing can be accomplished with a small, reliable, portable, and inexpensive device, which can be dropped into the deep sea, for example from a helicopter, and begin transmitting data on the condition of the sea surface. FIG. 3 is a schematic diagram showing the configuration of a wave height sensor system 300, and depicts a wave sensor using tilt switches 311, 312, 313, 314, 321, 322, 323, 324, 331, 332, 333, 334. Also depicted are flotation balls 351, 352, 353. Floatation balls 351-353 represent the buoyancy of the wave height sensor system as a tripod, meaning that they keep the structure upright and generally remain perpendicular to the sea surface. A processor and transceiver module 371 is used to receive data from tilt switches 311-334 and flotation balls 351-353, store the data in database 373, and communicates the information concerning wave patterns. Processor and transceiver module 371 may receive the data from tilt switches 311-334 in any convenient manner, and the data may be encoded, for example as a Grey code input, which has the further advantage of reducing ambiguities caused by metastable states of tilt switches 311-334 and reducing transmission errors. Similarly, it is further possible to use local filtering or local intelligence so as to be capable of reporting back a preprocessed signal, particularly in regard to preprocessing out local noise.

The processor in processor and transceiver module 371 is able to compare the sensed data from tilt switches 311-334 with patterns of known sea conditions, which may be stored in database 373. In addition, processor 373 can be used to store patterns in database 373 as known patterns as a learning mechanism.

In the depicted configuration, tilt switches 311-334 are arranged in three sets of four tilt switches, depicted as 311-314, 321-324, and 331-334. The tilt switches within each set are matched as to sensed tilt angle, meaning the tilt switches within the set will indicate tilt at substantially the same predetermined angle. The different sets of tilt switches are set to have different sensed tilt angles. Thus, tilt switches 311-314 could be set to sense substantially identical slight tilt angles, tilt switches 321-324 could be set to sense substantially identical moderate tilt angles, and tilt switches 331-334 could be set to sense substantially identical steep tilt angles. The tilt angles are determined empirically, and the tilt switches in the different sets are intended to respond differently to sea conditions, sufficiently to afford a range in which the degrees of tilt correspond to different sea conditions. In this non-limiting example, "slight" references a tilt consistent with sea conditions which are mild, and slightly above a calm condition. By way of non-limiting example, "slight" could be positioned at 15 deg.; "moderate" could be positioned at 30 deg., and "steep" could be positioned at 60 deg. These values are selected in order to obtain different responses from the different sets of tilt switches in accordance with sea conditions.

The use of accelerometers is similar, and could also be as represented in FIG. 3. While accelerometers promise greater sensor accuracy, that does not necessarily translate into more accurate wave height predictions as previously mentioned. Variables such as gyroscopic spin, the Earth's gravity, quantized and statistical noise, and even the saltwater environment can work in concert to negate the greater accuracy. Experimental testing can identify which approach works best under which conditions.

The wave height sensor system 300 is provided as a small, reliable, portable, and inexpensive device, which can be dropped into the deep sea, for example from a helicopter, and begin transmitting data on the condition of the sea surface is sought. In particular, the level of detail required can be described by sea condition levels, for example, one of five levels, identified as Levels 1-5, if a five-level scale is used.

The relative heights of the tilt switches 311-334 do not control the actual tilt angle, although it is possible that a tilt switch mounted higher in a buoy will be more sensitive to rate of movement, depending on the roll center of the movement. In that regard, it is possible that a tilt switch which is higher on the buoy used as the wave height sensor system 300 will be more sensitive to spurious motion; however, it is not the height, but the angle of incidence with the antenna, which determines how steep a wave must be to register by closing the tilt switch. The steeper the tilt angle switch on the antenna, the more steep must be the wave to register on it. In a physical configuration, higher tilt angle switches are more steeply positioned within the buoy. Each successive tier of steepness is cemented such that the angle it makes with the ocean surface must be double that of the tier below (where possible). By way of non-limiting example, the three tiers could be positioned at 15 deg., 30 deg., and 60 deg. to maximize the utility of the readings of the device for the machine learning algorithm; although the actual angles selected will be determined empirically in order to optimize for a widest anticipated range of sea conditions and for an ability to differentiate sea conditions.

By providing a greater the number of tiers, it is possible to set a lesser amount of differential between successive tiers. If the tilt switches are mounted accurately, it is possible to transfer learning by one sensor system to other sensor systems for an economy of scale.

In a calm sea, the sensor system 300 will form a normal with the surface of the ocean. As the sea is at first rocked by gentle waves, switches 311-314 will make intermittent contact, followed by switches 321-324 in moderate seas, and finally, switches 331-334 will make intermittent contact in the roughest seas. The activation of individual switches 311-334 within each group 311-314, 321-324, and 331-334 depends on the orientation of the wave to the wave height sensor system 300.

Flotation balls 351, 352, 353 maintain alignment with the wave surface, causing switches in the groups 311-314, 321-324, and 331-334 to make contact in successive order. In particular, rotation about the z axis is accounted for by taking the OR function of switches (311, 312, 313, 314). Similarly, OR (321, 322, 323, 324), and OR (331, 332, 333, 334) are also taken. The closer the tier is to the base of the unit, the less the incident wave slope need be for triggering the switch (e.g., for the contacts to be closed if the switch is configured as an N.O. switch). It is also noted that if two of switches 311-334 within the same group but at different angles sense tilt, this implies that the wave height sensor system 300 experienced more of a tilt.

The computer chip, transceiver, and batteries lie at the base of the unit and thus also serve to help keep the sensor system 300 upright. Finally, the downward angle that each tier of tilt switches makes with the sensor system 300 to which they are attached may be manually adjusted so that they give the fewest false positives and true negatives—the role of which will become clear below. The disclosed non-limiting canopy design may be hermetically sealed, where the battery (e.g., Li-ion) is recharged by magnetic coupling. In fact, if the electronics are held just below the surface of the water by their weight, then the device will be more resistant to being capsized. Having three floats and four poles for the tilt switches tends to vie against any persistent chance alignment of the device.

Figure 4:
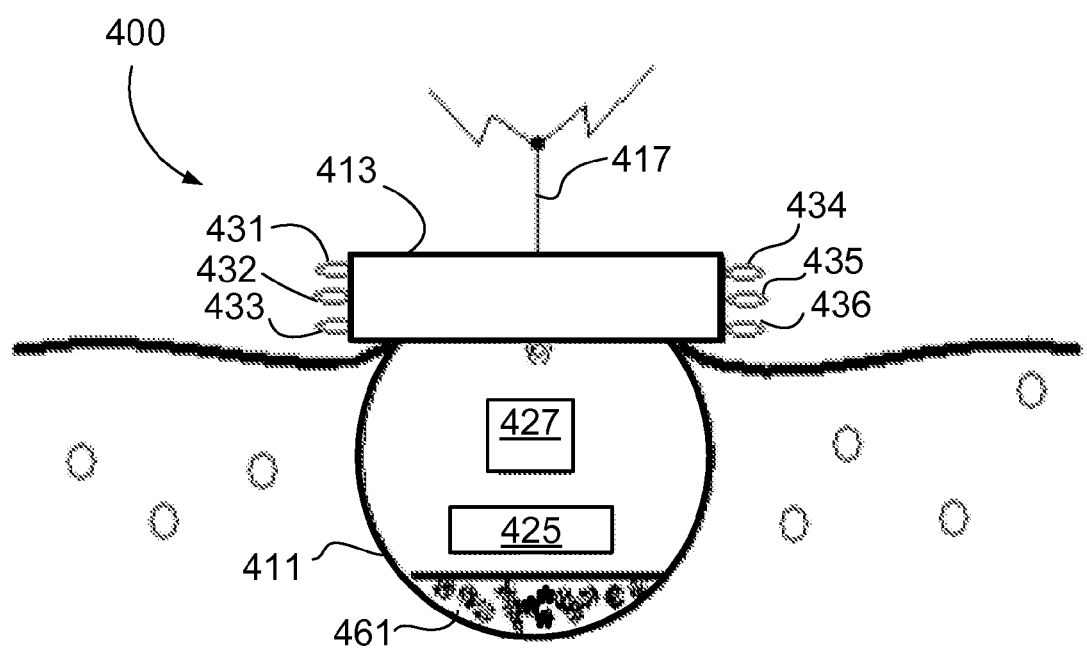
FIG. 4 is a diagram showing an example physical configuration for the wave height sensor system of FIG. 3, provided as a free floating buoy.

FIG. 4 is a diagram showing an example physical configuration for the wave height sensor system of FIG. 3, provided as a free floating buoy 400. Instead of floatation balls 351-353 as described in connection with FIG. 3, a free floating buoy tilts in accordance with the passage of waves. Buoy 400 essentially comprises a floating capped sphere 411 with a chapeau section 413 and a protruding high-frequency antenna 417. The buoy 400 carries a sensor package comprising, microprocessor 425, transceiver 427, a set of tilt switches 431-436, and power supply 461. The contents are hermetically sealed for purposes of being resistant to the marine environment.

While six tilt switches 431-436 are shown, it is expected that twelve or more tilt switches will be used. In a non-limiting example, sphere 411 is a plastic-coated metal sphere forming a marine-proof Faraday cage. Power supply 461 may comprise a battery pack using Li-ion batteries, which may also serve as ballast. The batteries may be charged by magnetic coupling. Tilt switches 431-436 may be arranged in multiple planes, so that each plane can be tilted to a desired angle for the sensors in that plane. In one configuration, the tilt switches are arranged four per plane, with three planes, where each plane is offset at varying degrees from parallel to a flat sea. It is noted, however, that the height of the tilt switch within buoy 400 is not itself determinative of the sensing angle of the tilt switch. The chapeau section 413 is made of buoyant material.

The ballast (power supply 461) is adjusted so that the chapeau section 413 sits just above a flat ocean surface without closing the tilt switches. The offset of tilt switches 431-436 is selected so that maximum degree of detectable tilt would not intersect a flat ocean surface. Thus, if the device is sitting on a totally calm sea, then no tilt switch may respond. If each tilt switch 431-436 is inserted so it angles upward, at least slightly, then no tilt switch will respond on a calm sea. The tilt switches 431-436 may be made more rugged by coating them with silicon rubber so as to withstand all but the harshest of sea landings. In particular, if the diameter of sphere 461 exceeds that of the chapeau section 413 plus tilt switches 431-436, then additional protection is provided. Finally, the tilt switches 431-436 may be fully recessed inside acrylic hoops to provide shock protection, especially during initial deployment, for example if buoy 400 is dropped from altitude into the sea.

Figure 5:
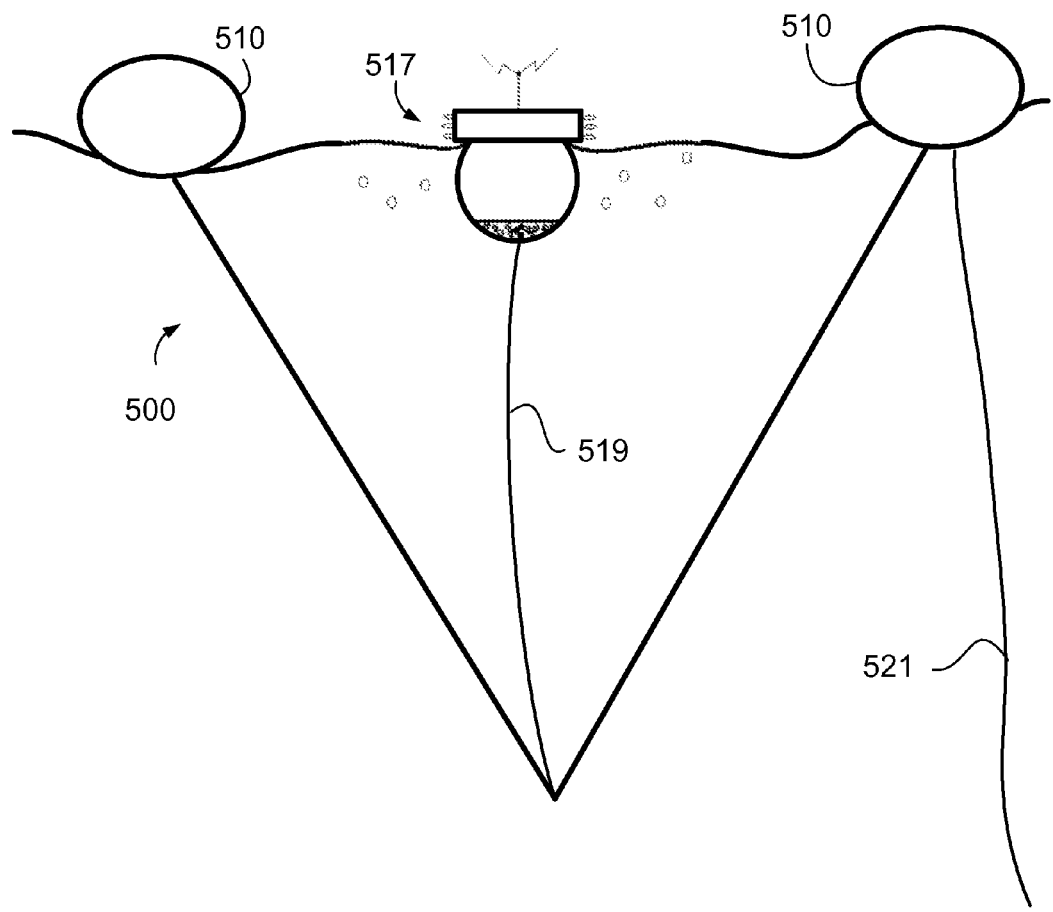
FIG. 5 is a diagram showing an example physical configuration of a wave height sensor system in which a buoy frame is maintained at a desired location.

While buoy 400 is shown as a free-floating buoy, it is possible to tether the sensor system. FIG. 5 is a diagram showing an example physical configuration of a wave height sensor system in which a buoy frame 510 is anchored or otherwise maintained at a desired location and serves to restrain a sensor buoy 517 in its lateral movement, by means of a tether line 519. Buoy frame 510 is itself also tethered, as shown at 521, but the tethering of sensor buoy 517 to buoy frame 510 enables sensor buoy 517 to react in a predictable manner to its tether at tether line 519.

It is also possible to tether the buoy 400 or 517 so that the buoy remains aligned in a particular compass direction. This can be useful in circumstances in which information on wave direction is desired.

The present system addresses a need to ascribe a sea state based on wave height. Each tier of switches is able to provide outputs which can be OR'd at a sampling rate sufficient to capture the signature of fast-moving waves, but not so fast as to introduce excessive noise. A non-limiting estimation is that about every 0.1 seconds should do nicely. First, a Level 1, or calm sea state, might generate the pattern, over an observation window of a few seconds as follows. Here, <T1> is the level whose sensing threshold is closest to a calm sea, whereas <T3> has much less sensitivity. In this example, there are three levels of sensitivity to sea motion, <T1> as high sensitivity or low sensing threshold, <T2> as medium sensitivity or threshold, and <T3> as low sensitivity or high sensing threshold. This provides three levels of sensitivity to sea motion—low, medium, and high. The low sensitivity only registers in rough seas.

<T1>: 0 0 0 0 0 1 0 0 0 0 0 0 0 0 0 1 0 0 0 0 0 0 0 1 0 0 0 0 0 0 0 0 0 0 0 0 0 0 1 0 0 0 1 0 0

<T2>: 0 0 1 0 0 0 0 0 0 0 0 0 0 0 0 0 0 0 0 1 0 0 0 0 0 0 0 0 0 0 0 0 1 0 0 0 0 0 0 0 0 0 0 0

<T3>: 0 0 0 0 0 0 0 0 0 0 0 0 0 0 0 0 0 0 0 0 0 0 0 0 1 0 0 0 0 0 0 0 1 0 0 0 0 0 0 0 0 0 0 0

If the sea were absolutely calm, then the salient question would be how did the 1s get into the system? The answer is that even calm seas can have local spots at certain times that are noisy relative to the norm, attributable to the principle of entropy. Here, empirical tests will lead to the design of very simple filters not unlike those common in digital filtering technology. An example of such a filter here would be 0 0 1 0 0→0 0 0 0 0, which in the language of computer science are known as Type 1 grammatical productions. Such filters may also be useful in countering rotation of the device, which may introduce a blip as the OR function moves from one tilt switch to an adjacent one. Filters are manually produced by studying the <T1> data streams for ways to characterize errors before they are injected.

A physical filter is to be used next to independently remove as much noise as possible from each tier of tilt switches. This serves to improve the performance of the learning mechanism as might well be expected. In this regard, a logical filter converts information. For example, 1 1 1 1 0 1 1 1 1 might logically be converted to remove noise to 1 1 1 1 1 1 1 1 1. A physical filter does the same, but instead of performing computations, relies on the physics of the device design. Thus, for example, having a longer tube in a mercury tilt switch will pretty much accomplish the same physically.

Figure 6:
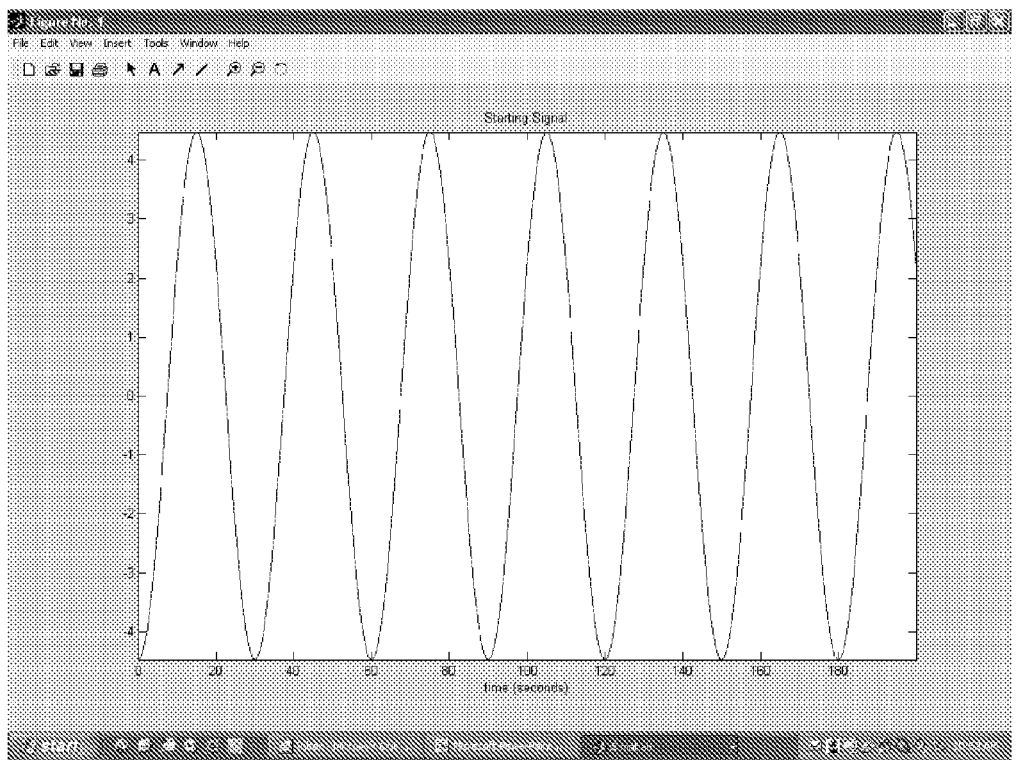
FIG. 6 is a graphical depiction showing a starting sinusoidal wave.
Figure 7:
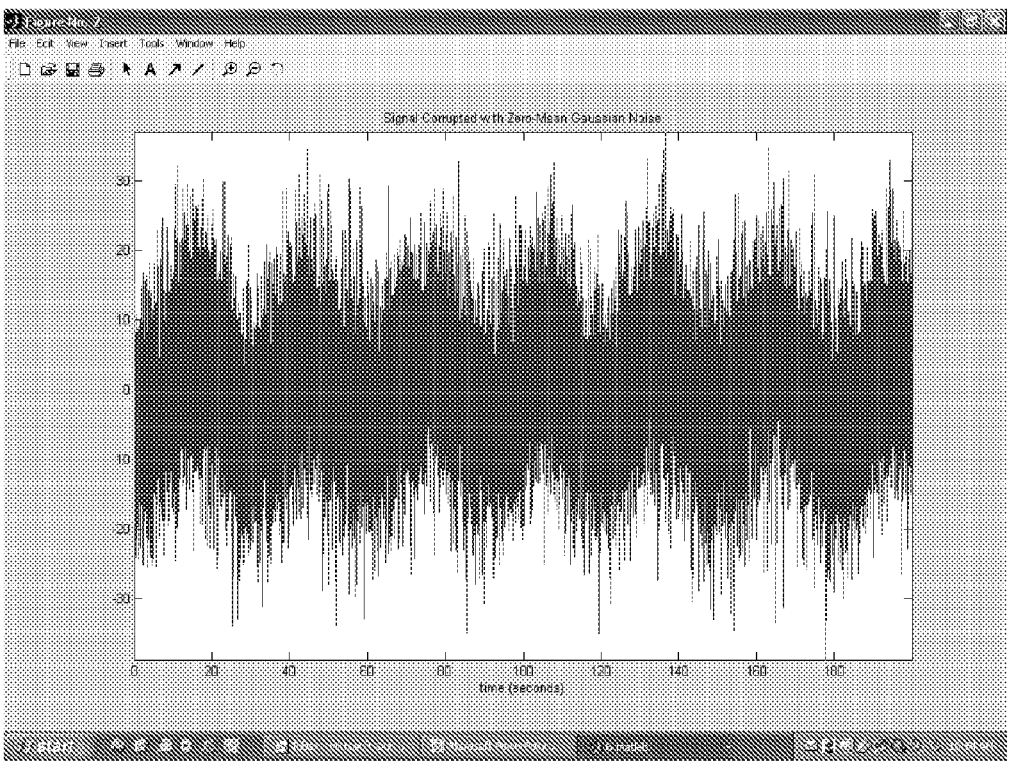
FIG. 7 is a graphical depiction showing the signal corrupted by injecting some Gaussian noise to better simulate the real-world ocean environment.
Figure 8:
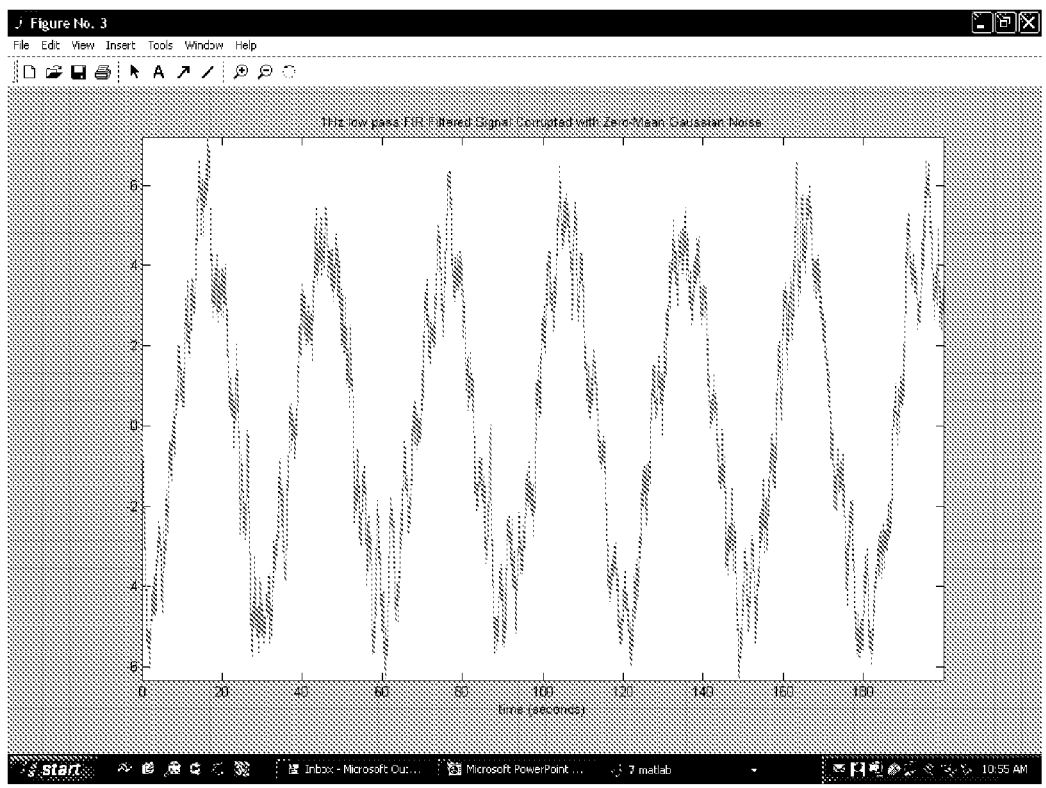
FIG. 8 is a graphical depiction showing the noisy signal after being passed through a 1 Hz low-pass band filter.
Figure 9:
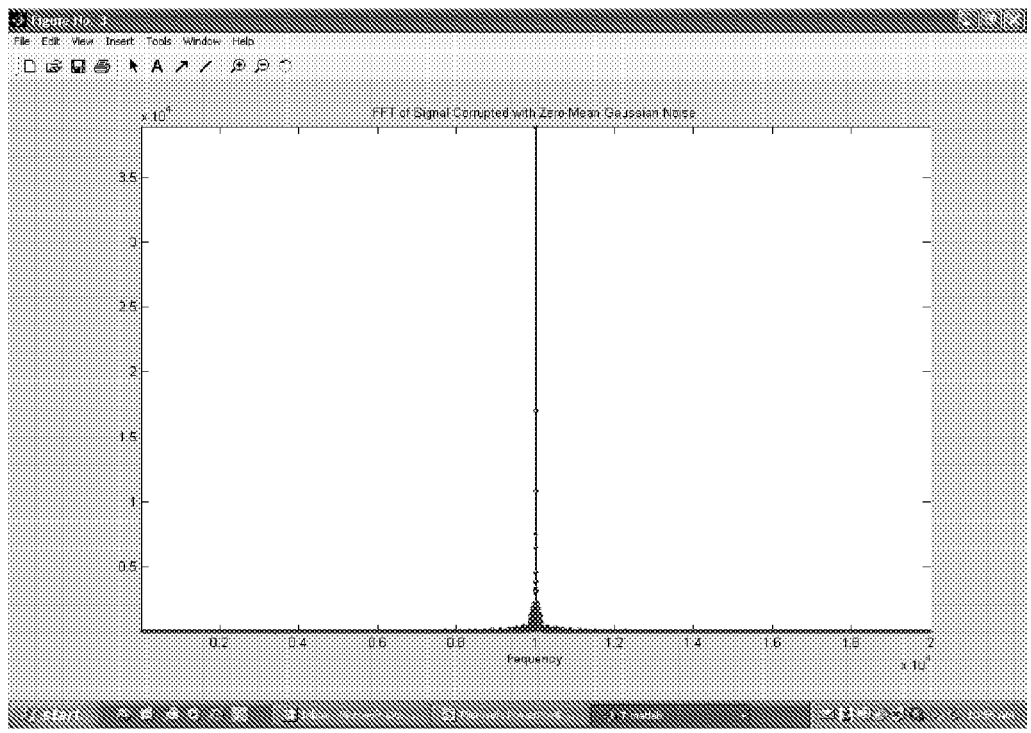
FIG. 9 is a graphical depiction showing the result of taking the FFT of the corrupted signal to convert it into a frequency signal.

FIGS. 6-12 depict an example set of waves obtained from a single series of hypothetical measurements. FIG. 6 depicts a starting sinusoidal wave, which of course represents no physical measurements. FIG. 7 shows the signal corrupted by injecting some Gaussian noise to better simulate the real-world ocean environment. FIG. 8 represents the noisy signal of FIG. 7 after having been passed through a 1 Hz low-pass band filter. FIG. 9 shows the result of taking the FFT of the signal to convert it from a time domain signal into a frequency domain signal.

Figure 10:
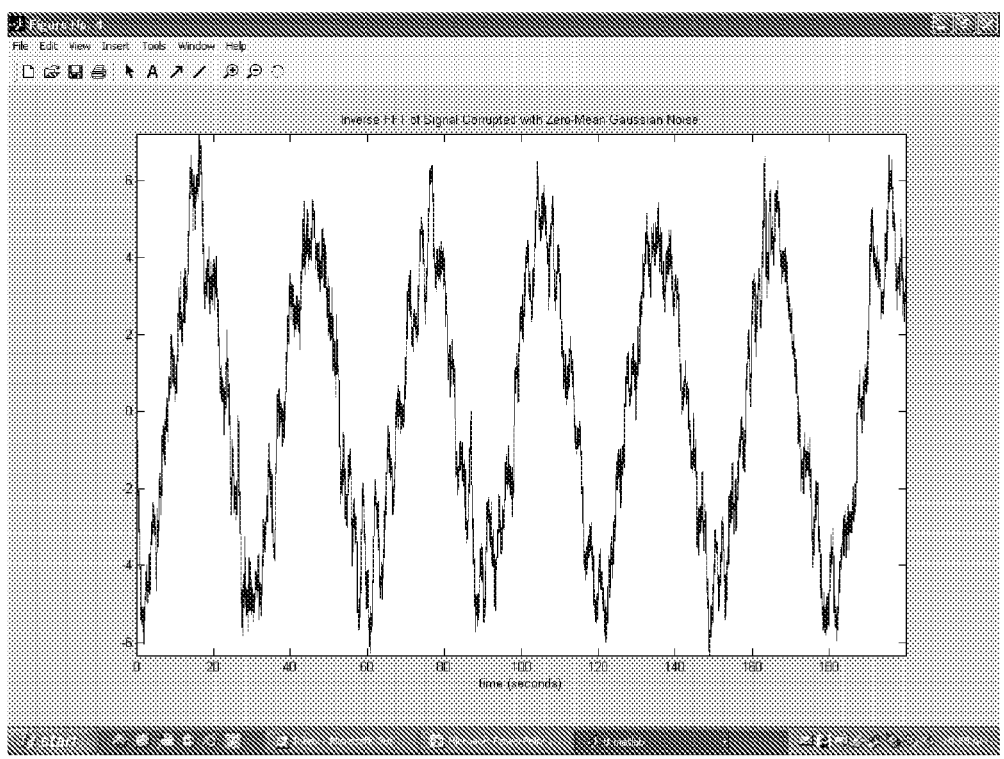
FIG. 10 is a graphical depiction showing the inverse FFT of the noisy signal.
Figure 11:
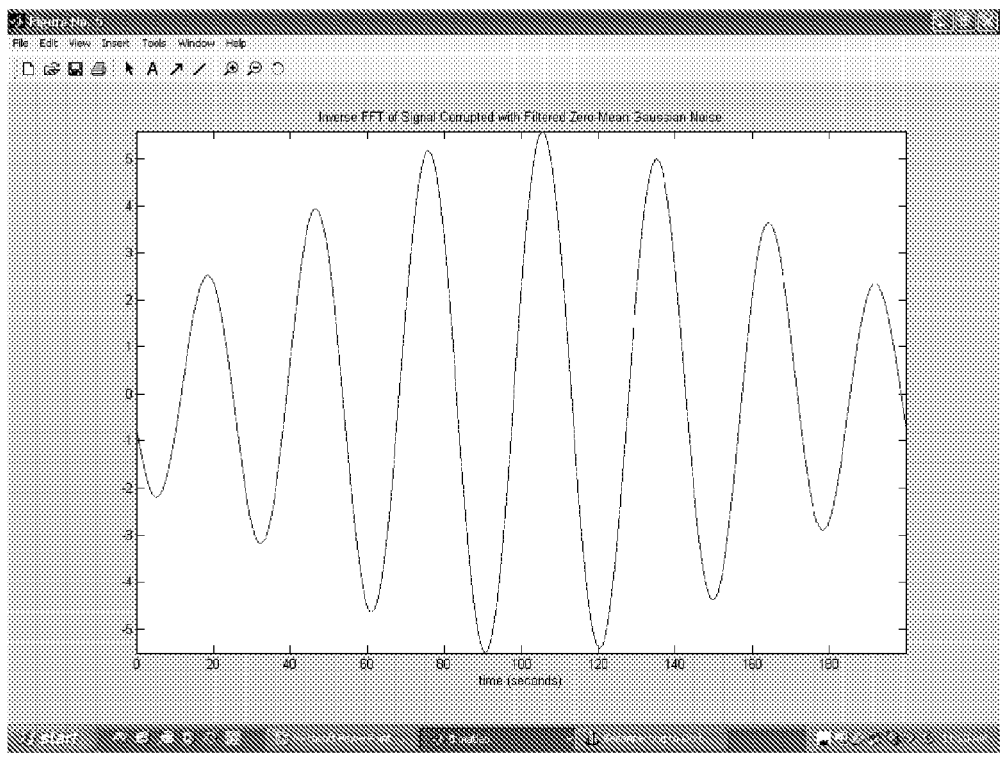
FIG. 11 is a graphical depiction showing the inverse FFT of the signal of FIG. 10 after zeroing out observed noise.
Figure 12:
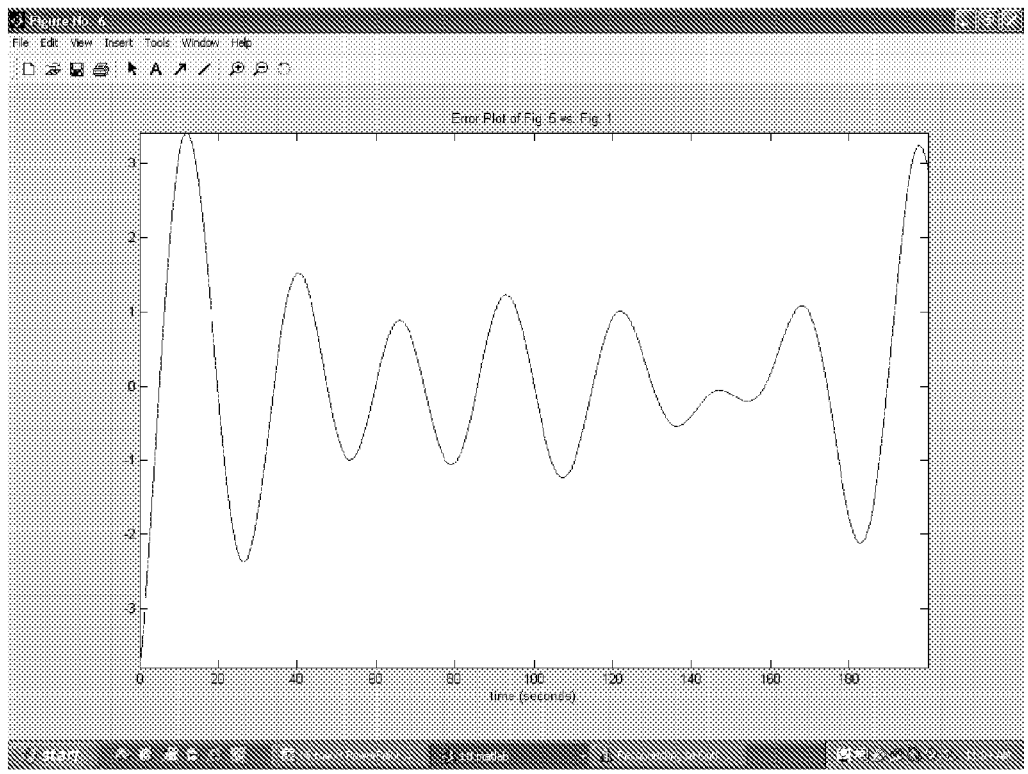
FIG. 12 is a graphical depiction showing an error plot between the original and processed waves.

FIG. 10 shows the inverse FFT of the noisy signal. FIG. 11 shows the inverse FFT of the noisy signal corresponding to FIG. 10, but taken after zeroing out observed noise. This results in a substantial smoothing, as compared with FIG. 10, in which the rising and falling pattern in the waves is due to the fact that the measured interval is not an integral number of periods; i.e., a condition to be expected in the open ocean. FIG. 12 provides an error plot between the original and processed waves.

This filtering of ambient noise from the wave train enables more reliable predictions of wave height to be issued. In particular, as the number of summed waves in the open sea grows large, the number of frequency spikes in the FFT grows large too. Then too, the lack of precision in their frequency tends to limit the level of noise that can be zeroed. This means that the pure physical methods are necessarily limited in their capability to delimit real ocean noise, which is an advantage of using a machine learning approach. By employing such pure physical methods as front-end filters, fusing the produced patterns, and correlating the results with observed wave heights through the contained machine learning mechanism at the back end, the best of both worlds is achieved. Simply put, the technique results in the physics and the computer science becoming complimentary and not competitive.

Next, a Level 2 or typical sea state might generate the pattern, over an observation window of a few seconds of:

<T1>: 1 0 1 0 0 1 1 0 1 1 0 1 1 0 1 1 0 0 1 1 1 0 0 1 1 0 1 1 0 0 1 1 0 1 0 1 0 1 0 1 1 0 0 1

<T2>: 0 1 0 0 0 1 0 0 0 1 0 0 1 1 1 0 0 1 0 1 0 0 0 0 1 0 0 1 1 1 0 0 0 0 0 1 1 0 0 1 0 0 0 1 0 0

<T3>: 0 0 0 0 0 0 0 0 0 0 0 0 0 0 0 0 0 0 0 0 0 0 0 0 0 1 0 0 0 0 0 0 0 0 1 0 0 0 0 0 0 0 0 0

Some of the zeros are caused by rotation of the device. While this could be negated somewhat through the use of mechanical stabilizing fins, such rotation is included in as much as it factors into the roughness of the sea metric (i.e., rougher seas internally vie for greater wave heights). It is not always practical to accomplish this using an accelerometer-based model because rough seas interfere with the accurate measurement of acceleration in wave height. A Level 5 or extreme sea state might generate the pattern over an observation window of a few seconds of:

<T1>: 1 1 1 1 1 1 1 1 1 1 1 1 1 1 1 1 1 1 1 1 1 1 1 1 1 1 0 1 0 0 1 1 1 1 1 1 1 1 1 1 1 1 1 1 1 1

<T2>: 0 1 1 1 1 1 1 1 1 1 1 1 1 1 1 1 1 1 1 1 1 1 1 1 0 0 1 0 0 0 1 1 1 1 1 1 1 1 1 1 1 1 1 1 1 1

<T3>: 0 1 0 1 0 1 0 1 0 1 1 1 1 1 1 1 1 1 1 1 1 1 0 1 0 1 0 1 0 1 1 1 1 1 1 1 1 0 1 0 1 1 0 1 0

It is noted that the leading and trailing edges of the wave generate the same signal on account of the OR function at each tier of tilt switches. More tiers may be used for greater discriminatory power (i.e., accuracy); however, it is believed that relatively few tiers are sufficient given (1) the mechanical limitations of tilt-switch sensing, (2) ambient noise in ocean movement, and (3) the limited number of categories (e.g., five) of sea states being discriminated.

Machine learning requires that each multiple vector grouping over some small finite time period be paired with a proper descriptive consequent, which details the level of the sea. Assuming a 0.1 second sample rate and three tiers, then 1 GB RAM provides for on the order of one year of full-time continuous recording.

An embodiment of a period learning algorithm follows.

1. For i=1, m where m is the number of tiers (e.g., 3-6)
    Pair: (<T1>, Level), (<T2>, Level), . . . , (<Tm>, Level), where Level is provided by feedback on the sea state during training
2. Then, for any given observation, <T1>, <T2>, . . . , <Tm> will be generated, and while often similar, are not necessarily the same. The <Ti> may be pre-processed through one or more algorithmic filters, which may or may not be distinct by tier. These filters are designed by hand from observing empirical data so as to remove and/or smooth apparent incongruities. This results in a more accurate system.
3. Each observation period defines how long a <Ti> must be collected for before it can be stored. This of course depends on the wave period. The longer the period, the longer the time a <Ti> must be collected for. It is suggested that all <Ti> be collected for two minutes to facilitate comparisons in as much as it would be very difficult to capture the true period (a major disadvantage for transform-based techniques).
4. Matching two bit strings (e.g., bitcompareTo) simply counts the number of bits that are in agreement. For example, (0 1 0 1 1 1) and (1 0 0 1 1 1) yields 4.

5. A bisection algorithm is used to rapidly find that minute of two stored for each <Ti>, which best matches the current observation based on the max value produced by the search. Here, the bisection uses the matching score produced (e.g., 4, see above) for its' metric. This eliminates the problem of knowing a priori the start/end of a wave period. The method is justified over exhaustive search, since "shifting" in these bit strings tends to occur in (multi-)bytes, which are much longer than bits due to relatively slower wave motion. Such an algorithm finds the alignment in O(n log n) time; whereas, exhaustive search would be O($n^2$), where n is the length of <Ti> or about 600 here. Bisection search is not admissible here as the period found is not always the embedded optimal one; but, the time saved as well as the learning correction achieved is deemed to be more significant. That saved time allows for the processing of n/log n more <Ti>.

An embodiment of a bisection algorithm follows.

Function bisection (observedwaves[ ], awave, caselength)

```
{
  lo = awave.bitcompareTo(observedwaves [0]); // compares bit by bit
  for sum
  if (lo == |awave|)        // found it
       return 0;             // 0 is the starting index for awave
  // mid is the middle bit (within plus or minus one) of observedwaves
  hi = awave.bitcompareTo(observedwaves [mid]);
  if (hi == |awave|)        // found it
       return mid;           // mid is the starting index for awave
  if (hi > lo)
  {
     bestbitcompare = hi;
     bestmid = mid;
  }
  else
  {
     bestbitcompare = lo;
     bestmid = 0;
  }
  while(lo <= hi)
  {
    mid = lo + (hi − lo) / 2;
    cmp = awave.bitcompareTo(observedwaves [mid]); // first awave bits
    if (cmp == |awave|)    // found exact match
       return mid;           // mid is the starting index for awave
    else if (cmp < lo)       // search the lower part
       hi = mid − 1;
    else                      // search the upper part
       lo = mid + 1;
    if (cmp > bestbitcompare)
    {
       bestbitcompare = cmp;
       bestmid = mid;
    }
  }
  return bestmid;            // bestmid is the starting index for the best
                              found match
}
```

Example

Note that the function bisection can be slightly modified to return the number of matching bits as well. Let the filtered embedded wave be, awave=01010 and the filtered carrier wave be, observedwaves=0110111010. These were designed not to be perfectly matched so as to be more illustrative of the true world, while being manageable for illustrative purposes. All index counts start with position 0.
  a. lo=2
  b. hi=4
  c. mid=2+2/2=3
  d. cmp=01010 bitcompareTo 01110=4
  e. lo=4
  f. mid=4+0/2=4
  g. cmp=01010 bitcompareTo 11101=1
  h. hi=3
  i. lo>hi
  j. return bestmid=3 (i.e., starting index for awave that best matches period)
  k. We note that the found cmp of 4 was optimal in this case.

A history function is also set. The history function insures that each <Ti> is a dynamic refreshing circular queue. Thus, after the first 1,000 observations say, the first one (i.e., in each tier), may be overwritten.

A new <Ti>(s) need only be saved when the prediction differs from the feedback received during training Inasmuch as the system has fast processors and plenty of memory. Saving the data frequently assures good data integrity.

The prediction (fusion) algorithm is a simple majority voting scheme (i.e., similar to the brain's reticular formation). Consequentially, the number of tiers, m, is based on the pigeon-hole principle, as described below.

The resultant algorithm will interpolate and predict the level of wave membership with minimal training; i.e., over a wide range of classes. For example, two votes for Level 2 and one for Level 3 predicts a Level 2 wave. If subsequent feedback were to reveal that it truly was a Level 3 wave, then these two vector-level pairs would be corrected using the machine learning paradigm presented below.

Figure 13:
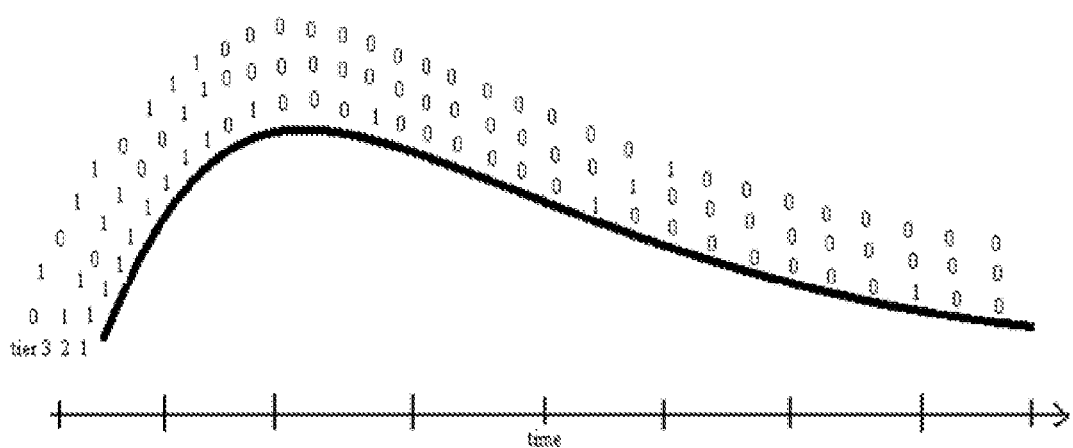
FIG. 13 is a graphical depiction of a computational wave signature overlaid with three tiers occurring with wave passage. Tier 1 is closest to the plot line; Tier 2 is in the center, and Tier 3 is furthest from the plot line.

FIG. 13 is a graphical depiction showing the three tiers of data coincident with the passing of a wave. Considering the three tiers, the lowest tier corresponds to switches <T1>, which are responsive to the gentlest of waves and the higher the tier, the greater the inclination must be for the tilt switch to respond. Tier 1, corresponding to switches <T1> is the lowest level in the graph, closest to the waveform (solid line). Tier 2 corresponding to switches <T2> is in the middle, and Tier 3, corresponding to switches <T3> and requires the greatest inclination for the tilt switch to respond, is shown at the top, furthest from the waveform. It can be observed that while each tier is subject to noise—even after filtering—it is the combination of tiers that serves to give a picture of the passing wave. Using the period found in the bisection algorithm above, let tier 1 (corresponding to <T1>) be the string of bits recorded for a passing wave, and similarly for tiers 2 and 3 (corresponding to <T2> and <T3>). The learning algorithm for predicting wave heights follows. Note that tiers 1, 2, and 3 (corresponding to <T1>, <T2>, and <T3>) are assumed to be supplied as properly filtered input streams (see discussion above).

For any given wave, subsequent to the defined passage of a wave, a match is made of <T1>, <T2>, <T3>, . . . , <Tn> against the database appropriate for <Ti>. This approach can be far less sensitive to noise than is possible using accelerometers. This can be done in parallel and each <Ti> requires O(mn) processor time and space. Again, here we take m to be on the order of 1,000 rows per tier and n to be on the order of 1,200 data points per wave. The goal is to find for that row, which best matches the incoming <Ti>. If ever an exact match is produced, immediately return the paired consequent. Resolve ties in favor of the most-recent acquisition. The best match is returned independently in association with the <Ti>.

Now, the "pigeon-hole principle" is applied, which says that if n+1 pigeons must fit in n pigeon holes, then one hole must have two pigeons (to break ties). In this example, we have five Levels or sea states if a five-level scale is used. Thus, 6 tiers are used. Suggested angles are 5 deg. for Tier 1, 10 deg. for Tier 2, 20 deg. for Tier 3, and 30 deg. for Tier 4, 40 deg. for Tier 5, and 50 deg. for Tier 6.

It follows by definition that each of the six tiers will match exactly one sea state, or none at all upon cold start. Assuming that Level 1 is the cold start state, then exactly one sea state (not necessarily the same one) will always be returned as the best match for each tier.

A second-level knowledge base is incrementally acquired as was the first-level database above. The rules in this database are best explained by way of non-limiting example: i.e., if <T1>→Level 1 and <T2>→Level 2 and <T3>→Level 3 and <T4>→Level 4 and <T5>→Level 5, then <T6> must, by definition, be the tie breaker. This is always the case by default (i.e., whenever an applicable rule is not present in the second-level knowledge base—e.g., upon cold start). Thus, if <T6> were to vote for <Ti> here (i=1, 2, 3, 4, 5), then <Ti> would be the vote. If this vote is found to differ from observation, then the 6-tuple is paired with the actual observed level.

First, the second-level knowledge base must be corrected, where necessary, as this will not be possible after correcting the first-level database. For example, if say <T1>→Level 1 and <T2>→Level 2 and <T3>→Level 3 and <T4>→Level 4 and <T5>→Level 5 and <T6>→Level 1 characterizes the current prediction, then if user feedback evidences that the correct sea level were say Level i, then the predicted level must be changed to i, where not already so. Productions that are already imitated by simple voting are not acquired. If voting is correct, then an existing incorrect production, if any, is expunged. There will be at most one such production to expunge.

Whenever a first-level database or a second-level knowledge base gets the right answer, or is provided the correct answer by way of user feedback, then each element at the first level of that decision is adjusted to produce the same answer. For example, suppose that the correct answer were, "Level 1". Then, the recorded 2-minute context for each tier, which is likely to differ for each tier, is saved in the appropriate first-level tier and associated with the very same correct level.

This predictor-corrector method not only learns correct associations and embeds a fixed voting scheme thereof; but, it also learns how to correct its predictions based on past experience. This makes for super-linear learning. Notice how such learning is non-linear in its effects on subsequent voting.

This algorithm is deterministic because no first or second-level rule will ever have more than one possible consequent. All tiers and levels are also maintained in FIFO order, which does not result in any deletions until after say 1,000 waves are analyzed and recorded. While this may at first seem like a limitation, it is actually a good thing. It is good because there is a non-linear relationship between the first and second level rules and after a time, the first level can lose its relationship with the second level due to re-associating the consequents in the first level commensurate with learning there. Throwing out the oldest rules in both levels tends to keep the super-linear learning more efficient, which differs from the accuracy of prediction, which is never at issue (i.e., as a consequence of determinism in the bases).

Unlike the case for some devices, like multilayer, multi-category perceptions, this approach is assured to always converge to a solution.

While binary values from tilt switches in three tiers are described, it is possible to implement the sensing with more tiers or with one or two tiers. In the case of a single tier of tilt switches the pattern of bits would be compared with data corresponding to different open sea conditions, even though the angle for sensing of the tilt switches from horizontal is the same. It is also possible to use other forms of positional data for the machine learning approach and pattern matching.

Figure 14:
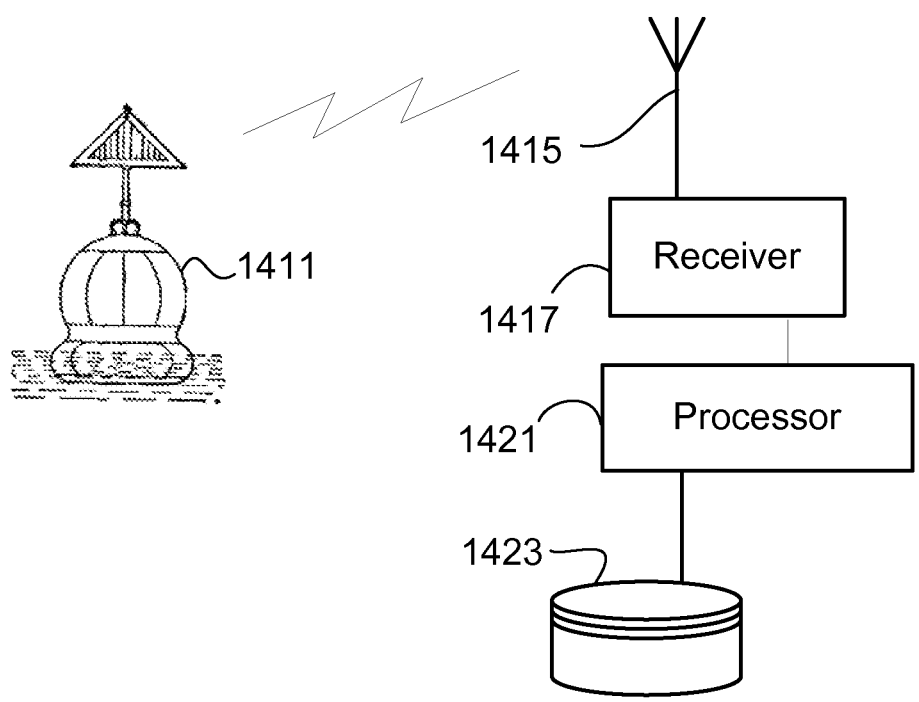
FIG. 14 is a diagram showing communication of data to an external receiver.

The data concerning the sea conditions is transmitted for external reception. While the processor (e.g., processor and transceiver module 371, FIG. 3) may be used to resolve the data from tilt switches 311-334, it is also possible to transmit the data for processing external of the buoy. FIG. 14 is a diagram showing communication of data to an external receiver. Buoy 1411 transmits data, which may be either raw data corresponding to tilt switches 311-334 (FIG. 3) or resolved data. The data is received at an external location, as represented by antenna 1415 and receiver 1417. Processor 1421 receives the data from receiver 1417 and stores the data in database 1423. Processor 1421 is able to compare the sensed data from tilt switches 311-334 with patterns of known sea conditions, which may be stored in database 1423. In addition, processor 1421 can be used to store patterns in database 1423 as known patterns as a learning mechanism.

In the case of raw data being transmitted, the raw data may transmitted using Grey code, which has the further advantage of reducing ambiguities caused by metastable states of tilt switches 311-334 and reducing transmission errors. Similarly, it is further possible to use local filtering or local intelligence so as to be capable of reporting back a preprocessed signal, particularly in regard to preprocessing out local noise. In the case of raw data being transmitted externally, database 1423 can be used to store sample patterns, and processor 1421 compares the received data with the sample patterns. As is the case with processing on board the buoy, processor 1421 can create a sample pattern database for individual buoys such as buoy 1411, or can use a standardized set of sample patterns.

It will be understood that many additional changes in the details, materials, steps, and arrangement of parts, which have been herein described and illustrated to explain the nature of the invention, may be made by those skilled in the art within the principle and scope of the invention as expressed in the appended claims.

I claim:

1. A system comprising:
   a buoy having more than two tiers each having plurality of tilt switches, the tiers located at different vertical positions of the buoy; and
   a processor, operatively connected to the tilt switches, configured to match binary outputs of observed tilt switch data from each tier of tilt switches to stored tilt switch data contained in a database operatively connected to the processor, each string of stored tilt switch data associated with a particular sea state condition level, the processor further configured to use majority voting to determine a selected sea state condition level based upon the particular sea state condition levels associated with the matched stored tilt switch data for each of the tiers of tilt switches and return the selected sea state condition level from the database.

2. The system of claim 1 further comprising:
   a transceiver operatively connected to the processor; and
   an antenna connected to the transceiver.

3. A method comprising the steps of:
   providing a buoy having more than two tiers each having plurality of tilt switches, the tiers located at different vertical positions of the buoy;
   matching, using a processor operatively connected to the tilt switches, binary outputs of observed tilt switch data from each tier of tilt switches to stored tilt switch data contained in a database, each string of stored tilt switch data associated with a particular sea state condition level;

using majority voting to determine a selected sea state condition level based upon the particular sea state condition levels associated with the matched stored tilt switch data for each of the tiers of tilt switches; and returning the selected sea state condition level from the database.

4. The method of claim 3 further comprising the step of, prior to the step of matching binary outputs of observed tilt switch data from each tier of tilt switches to stored tilt switch data contained in a database, filtering the observed tilt switch data to remove noise.

5. The method of claim 4 further comprising the steps of:

receiving user feedback regarding the selected sea state condition level; and if the user feedback indicates a correct selection, then associating in the database, the observed tilt switch data from each tier with the selected sea state condition level.

6. The method of claim 3, wherein if any of the binary outputs of observed tilt switch data from the tiers of tilt switches matches to more than one string of the stored tilt switch data contained in the database, the associated particular sea state condition level used in the majority voting is the particular sea state condition level most-recently acquired in the database.

* * * * *